(12) United States Patent
Avery (10) Patent No.: US 6,610,116 B1
(45) Date of Patent: Aug. 26, 2003

(54) AIR FILTER SYSTEM

(76) Inventor: Neal H. Avery, 186 Valley View Ter., Mission Viejo, CA (US) 92692

( * ) Notice: Subject to any disclaimer, the term of this patent is extended or adjusted under 35 U.S.C. 154(b) by 65 days.

(21) Appl. No.: 09/633,369

(22) Filed: Aug. 7, 2000

(51) Int. Cl.[7] .............................................. B01D 46/00
(52) U.S. Cl. ......................... 55/385.1; 55/503; 55/504; 55/505; 454/154; 454/158
(58) Field of Search ................ 55/385.1, 385.6, 55/306, 490, 493, 498, 503, 505, 502, 391, 385.3, 497, 511, DIG. 31, 504; 454/158, 154; 24/168, 170, 326, 327

(56) References Cited

U.S. PATENT DOCUMENTS

| | | | |
|---|---|---|---|
| 3,366,363 A | * 1/1968 | Hogan et al. | ............... 454/154 |
| 3,686,835 A | 8/1972 | Strange et al. | |
| 4,148,732 A | 4/1979 | Burrow et al. | |
| 4,722,747 A | 2/1988 | Armbruster | |
| 4,825,469 A | * 5/1989 | Kincheloe | ................... 55/502 |
| 4,889,542 A | * 12/1989 | Hayes | ....................... 55/385.6 |
| D306,340 S | 2/1990 | Whiting | |
| 4,971,612 A | * 11/1990 | Loughran | .................... 55/487 |
| 5,127,876 A | 7/1992 | Howe et al. | |
| 5,141,539 A | 8/1992 | Hiouani | |
| 5,163,870 A | * 11/1992 | Cooper | ...................... 55/385.6 |
| 5,328,152 A | 7/1994 | Castle | |
| 5,370,576 A | 12/1994 | Krofchalk | |
| 5,399,119 A | 3/1995 | Birk et al. | |
| 5,462,569 A | * 10/1995 | Benjamin | .................. 55/385.6 |
| 5,545,241 A | 8/1996 | Vanderauwera et al. | |
| 5,554,205 A | * 9/1996 | Ernst et al. | ................. 55/385.3 |
| 5,567,230 A | 10/1996 | Sinclair | |
| 5,753,117 A | * 5/1998 | Jiang | ............................ 55/497 |
| 5,762,671 A | * 6/1998 | Farrow et al. | ................ 55/498 |
| 5,912,369 A | * 6/1999 | Reeves | ...................... 55/385.6 |
| 6,001,145 A | * 12/1999 | Hammes | ...................... 55/493 |
| 6,019,676 A | 2/2000 | Kim | |
| 6,045,599 A | * 4/2000 | Solberg, Jr. | .................. 55/498 |
| 6,093,227 A | * 7/2000 | Benasutti | ..................... 55/503 |
| 6,096,207 A | * 8/2000 | Hoffman, Jr. et al. | ........ 55/498 |
| 6,110,248 A | * 8/2000 | Liu | ............................... 55/498 |
| 6,139,607 A | * 10/2000 | Coulonvaux | ................. 55/498 |
| 6,143,049 A | * 11/2000 | Gieseke et al. | ............ 55/385.3 |
| 6,210,457 B1 | * 4/2001 | Siemers | ....................... 55/429 |

OTHER PUBLICATIONS

Webster's Ninth New Collegiate Dictionary, by Merriam–Webster, 1991, p. 245, 1991.*

* cited by examiner

Primary Examiner—Duane Smith
Assistant Examiner—Minh-Chan T. Pham
(74) Attorney, Agent, or Firm—Christie, Parker & Hale, LLP (57) ABSTRACT

An air filter system for use by airline passengers on commercial airlines and the like. The housing is configured to clamp to the gasper air supply nozzle of the airliner. The housing is configured to direct air from the air supply nozzle through the filter medium. Thus, the present invention provides a filter which may easily be installed by an airline passenger so as to mitigate airborne contaminants from the air supply nozzle of the airliner. The air filter system provides a flow of comparatively clean air to the passenger and the flow of comparatively clean air directs undesirable airborne contaminants found within the passenger cabin of the airliner away from the passenger, thus forming a region of comparatively clean air generally around the passenger.

82 Claims, 5 Drawing Sheets

AIR FILTER SYSTEM

FIELD OF THE INVENTION

The present invention relates generally to fluid filters. The present invention relates more particularly to an air filter system for mitigating the exposure of an airline passenger to undesirable airborne particulate and/or chemical substances.

BACKGROUND OF THE INVENTION

Modern passenger aircraft, such as commercial jet airliners, commonly include a passenger support unit (PSU) located generally above each passenger's seat. The PSU typically includes a reading light, an air supply nozzle and an emergency oxygen mask for each passenger. The air supply nozzle facilitates control of the quantity and direction of air provided to the passenger.

Such contemporary air supply nozzles are typically adjusted by the passenger, so as to direct a stream of air upon the passenger's face and/or torso. This stream of air is refreshing and is intended to enhance the comfort of the passenger.

Although such contemporary air supply nozzles do typically enhance the comfort of a passenger during flight, such contemporary air supply nozzles suffer from inherent deficiencies which tend to detract from their overall utility. For example, the air flowing through an air supply nozzle and being directed toward the face of a passenger may contain undesirable airborne contaminants such as germs, dust and pollen.

The air circulation system of a commercial airliner typically has a particulate filter incorporated therein. However, such filters must be changed periodically in order to maintain their effectiveness. Although both the Federal Aviation Administration (FAA) and the aircraft manufacturer provide guidelines regarding the frequency with which aircraft air recirculation filters must be changed, there is no assurance that the airlines actually follow such guidelines.

Indeed, there is generally a substantial incentive for airline companies to disregard such guidelines, since more frequent filter replacement is costly, not only in terms of parts and labor but also in terms of the down time of the aircraft incurring such maintenance (during which the aircraft is clearly not contributing to the revenue of the airline).

There are documented cases of germs being transmitted among passengers during an airline flight. For example, in one incident reported by the Centers for Disease Control and Prevention, six of 257 passengers contracted tuberculosis, presumably from a single inflected passenger aboard the airliner.

As a further example, an airliner containing one person who had the flu was known to sit on the ground for approximately three hours. Three days later, 38 of the 54 people aboard the aircraft had contracted the flu.

Anecdotal evidence of this sort is abundant. Moreover, it is not difficult to understand that when a number of people are crowded together into a comparatively small space, such as that afforded by a commercial airliner, airborne contagiums will tend to be transmitted from one passenger to another.

In view of the foregoing, it is desirable to provide an air filter system which mitigates the exposure of a passenger to undesirable airborne contaminants. More particularly, it is desirable to provide such an air filter system which is configured so that a passenger may install and utilize the air filter system personally, so as to assure the adequacy of the filtration afforded thereby.

SUMMARY OF THE INVENTION

The present invention specifically addresses and alleviates the above mentioned deficiencies associated with the prior art. More particularly, the present invention comprises an air filter system having a housing and a filter medium. The housing is configured to clamp to an air supply nozzle, such as that of a commercial airliner.

As discussed in detail below, the air supply gasper nozzles of different airliners vary considerably in their configuration or geometry. In order to enhance the utility of the present invention, the air filter system is configured so as to clamp onto a wide range of nozzle geometries utilizing a single embodiment thereof.

As used herein, the term clamp is defined to include attachment by urging together at least two generally opposed members of a first device (such as the air filter system of the present invention) so as to capture and grasp a second device (such as an air supply nozzle). Thus, according to the present invention, the term clamping includes grasping by a plurality of generally opposed fingers, as discussed in detail below. Those skilled in the art will appreciate that various other structures are likewise suitable for effecting such clamping. For example, clamping may alternatively be accomplished via a common hose clamp-like device or via any other similar structure. Moreover, clamping is defined herein so as to apply to any type of device which applies a compressive force to another device, so as to attach the two devices to one another.

The housing may be configured to clamp to any desired type of air supply nozzle, as discussed in detail below. According to one aspect of the present invention, the housing is configured to clamp to the air supply nozzle of a commercial airliner, so as to provide air to a passenger of the airliner in a manner which mitigates the exposure of the passenger to undesirable airborne contaminants. Further, since the housing is configured to be clamped to the air supply nozzle by the passenger, the passenger is assured of the adequacy of the filtration afforded thereby. That is, the passenger is able to assure proper operation of the air filter system by performing the necessary filter medium changes, as needed.

The housing is configured to direct air from the air supply nozzle through the filter medium, so as to remove undesirable airborne contaminants. In this manner, the undesirable transmission of contagiums and substances associated with allergies may be mitigated. Further, a substantial portion of other undesirable airborne contaminants may be removed. Indeed, carbon, ion-exchange resin, or another desired chemical filter medium may be included so as to mitigate the presence of undesirable chemical substances such as fuel, oil, or hydraulic fluid fumes. Thus, according to the present invention, cleaner, more pure air is provided to a passenger so as to enhance the passenger's comfort during flight and also so as to mitigate health risks which might otherwise be present during the flight.

The filtered air stream from the air filter system can be utilized to force unwanted airborne contaminants away from the passenger's breathing space. Thus, germs from the surrounding passengers, cabin dust and mold from inside the cabin can all be forced away from the passenger by utilizing the filtered air stream.

Preferably, the air filter system of the present invention comprises a collet which is configured to clamp to the air supply nozzle of an airliner. However, those skilled in the art will appreciate that various other means for clamping the housing to the air supply nozzle are likewise suitable.

As used herein, the term collet is defined to include any generally encircling or collar-like band, ferrule, flange or other device which comprises a plurality of fingers or finger-like projections which are capable of moving inwardly, so as to grasp an air supply nozzle.

According to the preferred embodiment of the present invention, the collet comprises a plurality of elongated independently articulated fingers which are movable inwardly so as to grasp the air supply nozzle of a commercial airliner. The collet is preferably configured such that the fingers are movable inwardly so as to grasp a gasper nozzle of a commercial airliner. However, as those skilled in the art will appreciate, the collet may be configured such that the fingers thereof move inwardly so as to grasp any desired type of air supply nozzle.

A clamp sleeve preferably receives a portion of the housing and the clamp sleeve urges the plurality of fingers to move inwardly, so as to grasp the air supply nozzle, when the clamp sleeve is moved, e.g., when the clamp sleeve is rotated with respect to the housing. The clamp sleeve and the housing are preferably threadedly attached to one another and configured such that the plurality of fingers move inwardly when the clamp sleeve is rotated clockwise from the passenger's point of view. Thus, a passenger tightens the air filter system to the gasper nozzle by turning the clamp sleeve in the same direction, i.e., clockwise, that is used to screw a lightbulb into a socket. Thus, the threads which attach the clamp sleeve to the housing preferably comprise left-handed threads. Alternatively, right-handed threads may be used.

An opening is preferably formed in the clamp sleeve and the opening is configured so as to urge the fingers inwardly toward the air supply nozzle such that a distal portion of the fingers effect engagement with the air supply nozzle, so as to removably attach the housing to the air supply nozzle.

Preferably, a resilient clamp pad is formed to each finger, so as to enhance grasping of the air supply nozzle by the fingers. Each resilient clamp pad is preferably formed of molded polymer or elastomeric material such as silicone or urethane. However, those skilled in the art will appreciate that various other materials are likewise suitable for forming the resilient clamp pad. For example, the resilient clamp pad may alternatively be formed from cork, felt, or leather, as well as various different fabric and fiber materials.

The housing preferably comprises an air inlet port and an air outlet port. The filter medium is mounted within the housing such that air entering the housing via the air inlet port is filtered by the filter medium prior to the air exiting the housing via the air outlet port. Alternatively, the filter medium may be attached to the outside of the housing, such that the filter medium covers the air outlet port thereof, for example.

The housing preferably comprises a separable two part housing defining first and second housing sections thereof. The first and second housing sections of the two-part housing preferably attach to one another via a plurality of bayonet detents to facilitate quick and convenient separation and attachment thereof. As used herein, the term bayonet detent is defined to include a detent which locks two items to one another when one of the items is pushed toward the other item and then rotated with respect to the other item, such as the type of detent commonly used to attach a bayonet to a rifle barrel.

Alternatively, various other means of attaching the first and second housing sections together may be utilized. For example, the first and second housing sections may be threadedly attached to one another. As a further alternative, fasteners, such as nuts, bolts, screws, etc., may be utilized to attach the first and second housing sections to one another. Indeed, any method which facilitates the convenient changing of a filter medium disposed within the housing may be utilized to attach the first and second housing sections to one another.

Separation of the first and second sections of the two-part housing facilitates removal and replacement of the filter medium.

The filter medium is preferably disposed within the housing such that the filter medium is held in place by the first and second sections thereof.

The filter medium preferably comprises a disposable filter medium, such that the disposable filter medium may be removed and replaced with respect to the housing when or before the effectiveness of the disposable filter medium is reduced substantially due to use. The filter medium preferably comprises an electrostatically charged, polypropylene, non-woven membrane.

Alternatively, the housing may be sealed, i.e., not easily opened, and the air filter system may be considered disposable. That is, rather than change the filter medium when the filter medium is no longer adequate for removing airborne contaminants from the air passing therethrough, a new air filter system is used. The new air filter system may utilize the clamping mechanism of the old air filter system or, alternatively, may include a dedicated, disposable clamp mechanism of its own.

A seal, preferably formed of a resilient polymer foam material, is optionally disposed proximate an air inlet port of the housing and is configured to mitigate air leakage intermediate the housing and the air supply nozzle when the housing is clamped to the air supply nozzle. That is, the seal is positioned upon the housing and is configured such that attachment of the housing to the air supply nozzle effects at least some compression of the seal, such that air leakage between the seal and the air supply nozzle is mitigated. Preferably, the seal is attached, e.g., via adhesive bonding, to the housing.

Preferably, an air outlet nozzle is pivotally attached to the housing so as to facilitate aiming of air exiting the housing. The air outlet nozzle of the housing mimics, to some degree, the aimable air outlet nozzle of the airliner. This may be desirable since, in some instances, the air filter system 10 of the present invention may inhibit aiming of the gasper nozzle 30. Thus, even when the air filter system of the present invention is installed upon an air outlet nozzle of an airliner, the passenger may direct the air output therefrom as desired.

Pivotal attachment of the air outlet nozzle to the housing is preferably facilitated by forming a ball upon the housing, preferably surrounding the air exit port thereof. The air outlet nozzle defines a complementary socket which receives the ball, so as to facilitate aiming of air exiting the housing. Alternatively, the ball may be formed upon the air outlet nozzle and the socket then formed upon the housing. Those skilled in the art will appreciate the various other means for facilitating aiming of air exiting the housing are likewise suitable.

A mounting assembly facilitates mounting of the housing to the air supply nozzle. The mounting assembly comprises the seal, the plurality of fingers defined by the collet, and the clamp sleeve.

Although use of the present invention is described and illustrated herein as being intended for the filtering of air from an airliner's air supply nozzle, those skilled in the art will appreciate that various other applications of the present invention are likewise suitable. For example, the air filter system of the present invention may similarly be utilized to filter air within the passenger compartment of various different types of vehicles, such as trains, buses, cars, trucks, boats, private aircraft and helicopters. Indeed, the present invention may be utilized to filter air in a wide variety of applications. Thus, discussion and illustration of the present invention as being specifically applicable to the filtering of air within an airliner is by way of example only and not by way of limitation.

The air filter system of the present invention may be formed substantially from a low cost, injection molded polymer material. Therefore, the air filter system of the present invention is inexpensive to manufacture and provides a low cost option for those airline passengers who are concerned about the presence of airborne contaminants aboard commercial airliners and the like. Since the air filter system of the present invention is simply clamped onto the existing gasper nozzle of a commercial airliner, such as via the aforementioned attachment mechanism, the air filter system of the present invention is convenient and easy to use.

According to an alternative configuration of the present invention, the housing is attached to a gasper nozzle via an adhesive, which is preferably formed upon a foam seal or gasket. According to this alternative configuration of the present invention, a passenger preferably merely removes a protective paper layer from the air inlet side of the housing, so as to expose an adhesive layer. The air filter system is then attached to the gasper nozzle by merely pushing the housing against the gasper nozzle, so as to effect adhesive bonding of the housing to the gasper nozzle.

Preferably, the adhesive and seal are formed such that the air filter system may be removed from the gasper nozzle without leaving a noticeable amount of adhesive thereon. Further, the adhesive and seal are preferably configured such that pulling a tab or the like of the seal effects removal of the air filter system from the gasper nozzle while also destroying the seal. Thus, the seal may be considered a one use only item. Additional seals may then be provided separately from the air filter system to facilitate reuse of the air filter system. 3M COMMAND ADHESIVE™ (a federally registered trademark of Minnesota Mining and Manufacturing Corporation of St. Paul, Minnesota) is one example of such an adhesive coated seal.

Thus, the present invention provides an inexpensive and easy to use air filter system for mitigating exposure to undesirable airborne contaminants such as germs, dust and pollen which may be disseminated via a passenger's air supply nozzle on a commercial airliner or the like.

These, as well as other advantages of the present invention, will be more apparent from the following description and drawings. It is understood that changes in the specific structure shown and described may be made within the scope of the claims without departing from the spirit of the invention.

DETAILED DESCRIPTION OF THE INVENTION

The detailed description set forth below in connection with the appended drawings is intended as a description of the presently preferred embodiment of the invention and is not intended to represent the only form in which the present invention may be constructed or utilized. The description sets forth the functions of the invention and the sequence of steps for constructing and operating the invention in connection with the illustrated embodiment. It is to be understood, however, that the same or equivalent functions and sequences may be accomplished by different embodiments that are also intended to be encompassed within the spirt and scope of the invention.

Figures 1, 2:
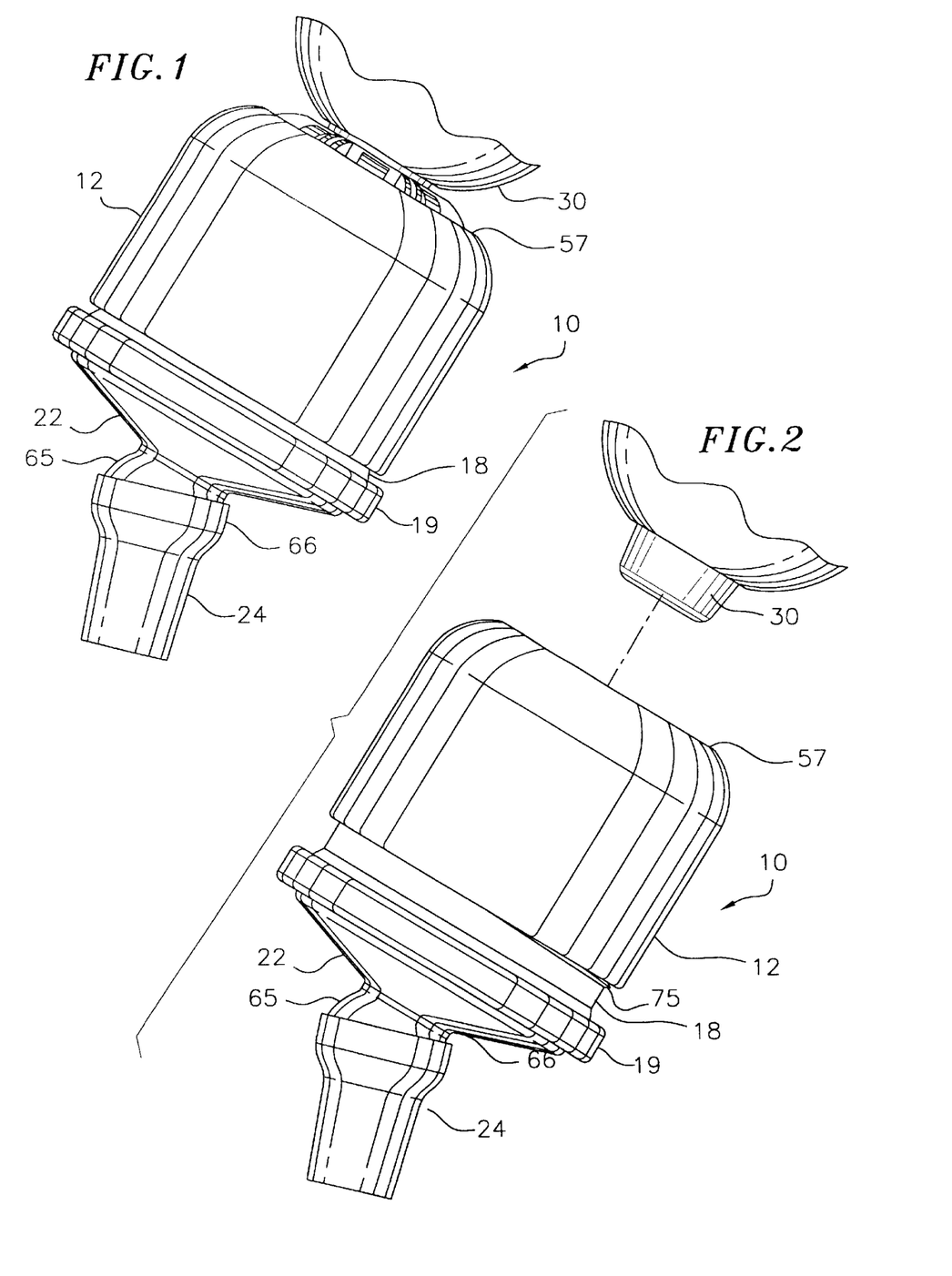
FIG. 1 is a semi-schematic, perspective view of the air filter system of the present invention installed upon an air supply nozzle via clamping.
FIG. 2 is a semi-schematic, perspective view of the air supply nozzle of FIG. 1, showing the air filter system removed from the air supply nozzle.

The present invention is shown in FIGS. 1–5, which depict a presently preferred embodiment thereof. Referring now to FIGS. 1 and 2, the air filter system 10 of the present invention may be mounted upon or attached to an air supply nozzle 30, such as the gasper nozzle of a commercial airliner. As those skilled in the art will appreciate, such gasper nozzles are commonly provided as a part of the passenger support unit (PSU) of a commercial airliner. Typically, each passenger has a dedicated gasper nozzle for providing a controlled flow of air to the passenger, so as to enhance the passenger's comfort during flight.

Such contemporary gasper nozzles are generally pivotally mounted (such as via a ball and socket arrangement) to the PSU such that they may be aimed by the passenger as desired, e.g., typically toward the passenger's head or torso. Air flow through the gasper nozzle may typically be adjusted by turning the gasper nozzle, which usually results in adjustment of a butterfly valve associated therewith.

However, as discussed in detail above, such air supply nozzles as the gasper nozzles of commercial airliners do not necessarily provide clean, uncontaminated air. Rather, it is not uncommon for the air provided by such air supply nozzles to be contaminated with airborne particulates and/or undesirable chemicals. These contaminants may result in the undesirable communication of disease, the aggravation of allergies and/or irritation and discomfort.

In order to mitigate the undesirable consequences of such airborne contaminants, while generally maintaining the desired comfort enhancing qualities associated with airline air supply nozzles, the air filter system 10 of the present invention is attached to the air supply nozzle, e.g., air supply nozzle 30, of an airliner. The air filter system 10 of the present invention contains a filter medium 20 (FIGS. 3 and 4) which, as discussed in detail below, tends to mitigate the presence of such undesirable airborne contaminants within the flow of air provided by the air supply nozzle 30. Further, the comparatively clean air output by the air filter system 10 tends to form an envelope or bubble of such comparatively clean air about the passenger at whom the output thereof is directed. This envelope or bubble of comparatively clean air tends to isolate the passenger from the adjacent, comparatively unclean air. Thus, the continuously flowing and filtered airstream of the air filter system 10 of the present invention desirably limits an airline passenger's exposure to germs and particulates found within the airliner's cabin.

Further, the air filter system 10 of the present invention comprises an air outlet nozzle 24 which facilitates directing of the air output therefrom in a desired direction, much in the same manner that air may be directed via a contemporary air supply nozzle 30.

According to the present invention, the air filter system 10 is attached to the air supply nozzle 30 via a mounting assembly which clamps the air filter system 10 to the air supply nozzle 30, as discussed in detail below.

Figure 3:
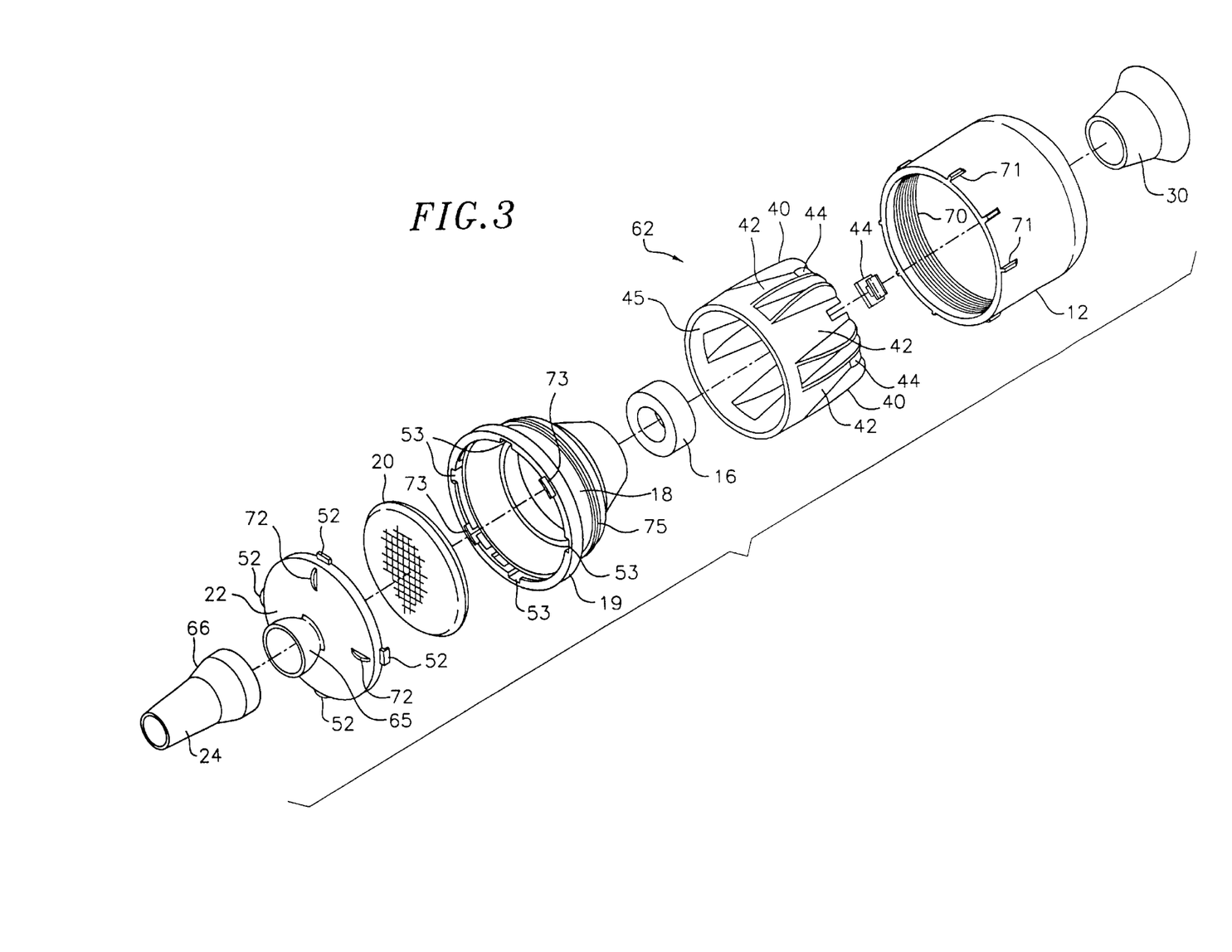
FIG. 3 is semi-schematic, perspective, exploded view of the air filter system of FIG. 1.
Figure 4:
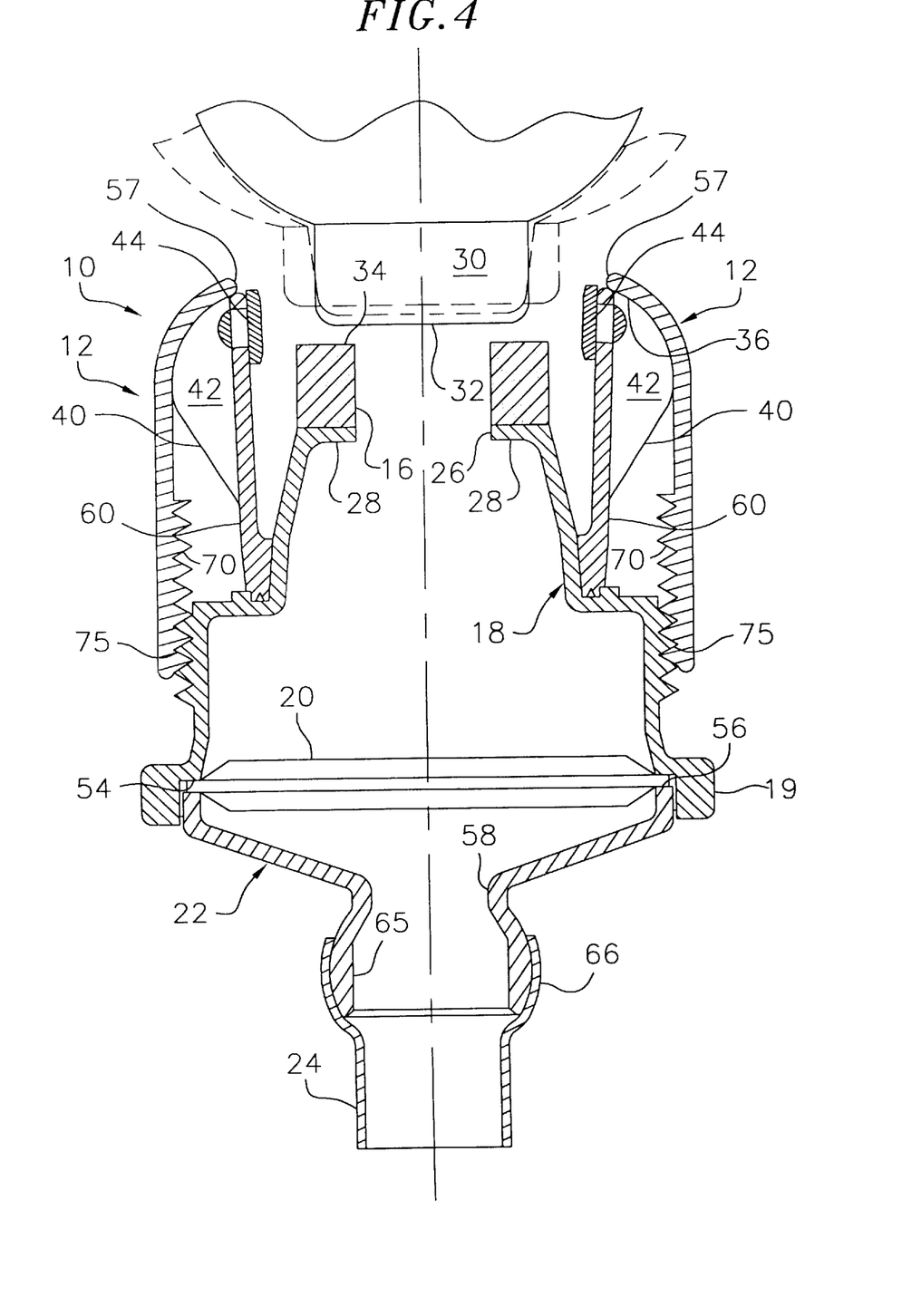
FIG. 4 is a semi-schematic, cross-sectional, side view of the air filter system of FIG. 1, showing that the housing is configured to clamp to a variety of different air supply nozzle configurations.
Figure 5:
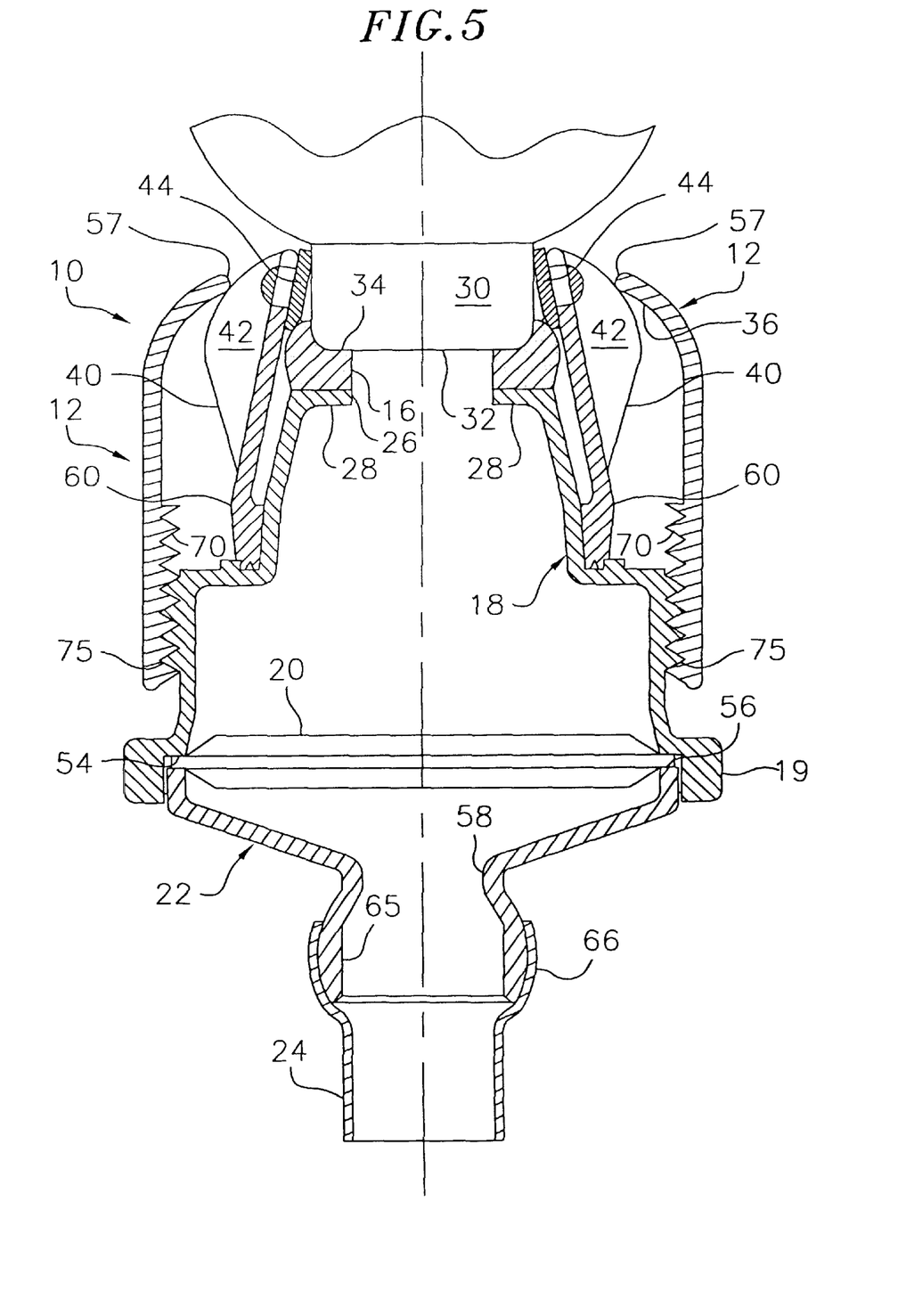
FIG. 5 is a semi-schematic, cross-sectional, side view of the air filter system of FIG. 1, showing the housing clamped to an air supply nozzle.

Referring now to FIGS. 3–5, the air filter system 10 of the present invention more particularly comprises a housing, which is preferably comprised of a first housing section 18 and a second housing section 22. The first housing section 18 has an inlet port 26 formed therein and, similarly, the second housing section 22 has an air outlet opening 58 formed therein.

The first housing section 18 and second housing section 22 are separably attached to one another so as to facilitate the easy and convenient placement and holding of the filter medium 20 therebetween, i.e., within the housing defined thereby. According to the preferred embodiment of the present invention, a plurality of male bayonet detents 52 are formed upon the second housing section 22 and a complementary plurality of female bayonet detents are formed upon the first housing section 18, such that the first 18 and second 22 housing sections may be attached to one another by pushing the second housing section 22 into the first housing section 18 and then rotating the second housing section 22 slightly with respect to the first housing section 18, so as to engage the male bayonet detents 52 to the female bayonet detents 53.

Optional alignment tabs 73 facilitate alignment of the second housing section 22 with respect to the first housing section 18 during assembly of the second housing section 22 to the first housing section 18. As those skilled in the art will appreciate, various such alignment tabs and/or slots may similarly be utilized to facilitate assembly of the various different components of the present invention utilizing contemporary automation processes.

Alternatively, the first 18 and second 22 housing sections may be removably attached to one another by any other desired method. Those skilled in the art will appreciate that various other means, e.g., threads or fasteners such as nuts, bolts and/or screws, may be utilized to effect attachment of the first 18 and second 22 housing sections to one another.

As a further alternative, the first and second housing sections may be permanently attached to one another and the air filter system of the present invention may then be considered disposable, as discussed above.

As yet a further alternative, the filter element may be attached to the outside of the housing, such as over the air outlet port 58 thereof, or may otherwise be replaceable without requiring disassembly of the housing.

The filter medium 20 preferably comprises a thin, generally circular filter element which becomes clamped or captured between the first 18 and second 22 housing sections when the first 18 and second 22 housing sections are attached to one another. The first housing section 18 has a shoulder 54 (FIG. 4) formed thereon and the second housing 22 has a generally complementary shoulder 56 formed thereon. The first 54 and second 56 shoulders are preferably configured so as to have approximately the same diameter and so as to be juxtaposed such that they capture and clamp the periphery of the filter medium 20 therebetween when the first 18 and second 22 housing sections are attached to one another. Those skilled in the art will appreciate that various other means for mounting the filter medium 20 within the housing are likewise suitable.

The filter medium 20 preferably comprises an electrostatically charged polypropylene non-woven membrane. However, those skilled in the art will appreciate that various other types of filter medium are likewise suitable.

According to the present invention, the air filter system 10 is attached to the air supply nozzle 30 by clamping the air filter system 10 thereto. More particularly, according to the present invention, the air filter system 10 is attached to the air supply nozzle 30 via a plurality of fingers 42 which are urged inwardly so as to grasp and hold the air supply nozzle 30 when a clamp sleeve 12 is moved with respect to the housing.

According to the preferred embodiment of the present invention, the clamp sleeve 12 is threadedly attached to the first housing section 18, such that rotating the clamp sleeve 12 with respect to the first housing section 18 in a manner which moves the clamp sleeve 12 toward the second housing section 22 causes the periphery of opening 57 (FIG. 4) to abut or cam against the fingers 42. More particularly, the periphery of opening 57 cams against the camming surface 40 of the fingers 42 in a manner which forces the fingers 42 inwardly against the air supply nozzle 30.

The outer ring 19 of the first housing section 18 and gripping tabs 72 formed upon the second housing section 22 cooperate to facilitate rotation of the second housing section 22 with respect to the first housing section 18, such as when the filter medium 20 is replaced. Changing of the filter medium 20 is accomplished by rotating the second housing section 22 via gripping tabs 72 while holding the first housing section 18 generally stationary via the outer ring 19 of the first housing section 18. In this manner, the second housing section 22 is separated from the first housing section 18 and the filter medium 20 may easily be removed and replaced.

The gripping tabs 71, as well as the outer ring 19 of the first housing section 18, may be used to facilitate installation of the air filter system 10 upon the gasper nozzle 30 of an airliner. That is, a passenger may hold the air filter assembly 10 by the outer ring 19 of the first housing section 18 while the clamp sleeve 12 is rotated via gripping tabs 71, so as to effect installation of the air filter system 10 upon the gasper nozzle 30.

Preferably, the clamp sleeve 12 is attached to the first housing section 18 by left-handed threads, such that rotating the clamp sleeve 12 clockwise (from a passenger's point of view when the air filter system 10 is being attached to the air supply nozzle 30) causes the clamp sleeve 12 to move toward the second housing section 22, so as to cause the fingers 42 to tighten against the air supply nozzle 30. Thus, the clamp sleeve 12 preferably comprises left-handed internal threads 70 which are complementary to left-handed external threads 75 formed upon the first housing 18.

Preferably, each of the fingers 42 has an elastomeric pad 44 formed proximate a distal end thereof, so as to enhance grasping of the air supply nozzle 30. The elastomeric pads 44 may be formed of any desired resilient material, as discussed in detail above.

Each of the fingers 42 is hingedly attached to the first housing section 18, such as via a living hinge formed at a proximal end thereof. Therefore, the distal end of each of the fingers 42 is independently articulated and may move radially inward and radially outward, so as to effect attachment and removal from the air supply nozzle 30, respectively. The living hinge 60 is preferably configured such that it spring biases of the fingers 42 radially outwardly.

As shown in FIG. 4, the clamp sleeve 12 and fingers 42 are configured to accommodate a variety of different configurations of the gasper or air supply nozzle 30. The clamp sleeve 12 and the fingers 42 are configured so as to facilitate a wide range of movement of the fingers 42 from the outboardmost position thereof to the inboardmost position thereof. Thus, the fingers 42 are capable of reliably attaching the air filter system 10 to various different air supply nozzles 30 found upon various different airliners.

A compressible seal 16 is preferably formed of a resilient polymer foam material such as non-reticulated urethane foam, one example of which is known as SUPER SEALT™, (a federally registered trademark of E. N. Murray Co. of Denver Colorado). Another suitable material for the seal 16 is polyether polyurethane foam, such as BLUE CONFORM, (a federally registered trademark of Fomex of Linwood, Pa.). The seal 16 inhibits air leakage intermediate the first housing section 18 and the air supply nozzle 30. Like the elastomeric pads 44, the compressible seal 16 may be alternatively formed of any desired resilient material.

The seal 16 is preferably attached to the first housing section 18 at a shoulder 28 thereof formed about the periphery of inlet port 26. The seal 16 is preferably adhesively bonded to the shoulder 28. Alternatively, the seal 16 may be attached to the first housing section 18 via ultrasonic welding or any other desired method. As shown in FIG. 5 and discussed in detail below, the seal 16 is compressed between the air supply nozzle 30 and the shoulder 28 of the first housing section 18 when the air filter system 10 is attached to the air supply nozzle 30.

According to the preferred embodiment of the present invention, a clamp finger assembly collet 62 includes all of the fingers 42 formed in a generally circular or barrel-like fashion so as to have a unitary construction which facilitates easily handling and assembly thereof. More particularly, the collet 62 comprises a plurality of separate, independently articulated fingers 42 which are attached to an annular base 45 via living hinges 60. Since the individual fingers 42 are not attached to one another, the distal end of each finger 42 is free to move radially inwardly and radially outwardly as its dedicated living hinge bends.

The collet 62 preferably comprises a single injection molded assembly which is attached, such as via adhesive bonding, to the first housing section 18. Those skilled in the art will appreciate that various other means, e.g., such as ultrasonic welding, are likewise suitable for attaching the collet 62 to the first housing section 18.

Optionally, the air filter system 10 of the present invention further comprises a ball 65 formed about the air outlet opening 58 of the second housing section 22 and an air outlet nozzle 24 attached to the second housing section 22 via a socket 66 formed in the air outlet nozzle 24 which receives the ball 65. The air outlet nozzle 24 facilitates aiming of the air flow from the air filter system 10 in a desired direction.

The components of the air filter system 10, such as the first 18 and second 22 housing sections, the clamp sleeve 12, the collet 62 and the air outlet nozzle 24 are preferably formed via the injection molding of a rigid, durable polymer material. However, those skilled in the art will appreciate the various other manufacturing techniques and materials are likewise suitable.

Having described the structure of the air filter system in detail above, it may be beneficial to describe the operation thereof. To attach the air filter system 10 to an air supply nozzle 30, such as a gasper air supply nozzle of a commercial airliner, the clamp sleeve 12 is first rotated in a manner which moves the clamp sleeve 12 away from the second housing section 22 (preferably in a counter-clockwise direction as viewed by the passenger), thereby allowing the distal ends of the fingers 42 to spring radially outwardly, so as to increase the diameter of the opening defined by the distal ends of the fingers 42, such that the air supply nozzle 30 may easily be received therein. The air filter system 10 is then positioned upon the air supply nozzle 30 by receiving the air supply nozzle 30 within the opening defined by the distal ends of the fingers 42. The air filter system 10 is preferably forced onto the air supply nozzle 30 sufficiently so as to at least partially compress the seal 16, as shown in FIG. 5. With the seal 16 so compressed, the clamp sleeve 12 is rotated (preferably clockwise from the passenger's point of view) so as to cause the clamp sleeve 12 to move toward the second housing section 22, thus causing the periphery of the opening 57 of the clamp sleeve 12 to cam against the camming surface 40 of the fingers 42 in a manner which urges the distal ends of fingers 42 radially inwardly against the air supply nozzle 30, thus clamping the air filter system 10 to the air supply nozzle 30.

As the fingers 42 move inwardly against the air supply nozzle 30, the elastomeric pads 44 compress slightly against the air supply nozzle 30, thereby enhancing the grip of the fingers 42 against the air supply nozzle 30 and thus assuring reliable attachment of the air filter system to the air supply nozzle 30.

After the clamp sleeve 12 has been tightened sufficiently to effect secure attachment of the air filter system 10 to the air supply nozzle 30, then the air outlet nozzle 24 of the air filter system 10 may be aimed so as to direct air flow in a desired direction. The air filter system 10 of the present invention may be rotated, so as to similarly effect rotation of the air supply nozzle 30 in order to adjust the amount of air flow. Thus, the direction and amount of air flow may be adjusted to enhance comfort of the passenger and/or to form a curtain, bubble or other barrier about the passenger which is comprised of the cleaner air from the air filter system 10 and which thus mitigates exposure of the passenger to less clean air within the cabin of the airliner. Thus, the air filter system 10 of the present invention provides a flow of comparatively clean air to the passenger and the flow of comparatively clean air directs undesirable airborne contaminants found within the passenger compartment of the airliner away from the passenger, thus forming a region of comparatively clean air generally around the passenger.

Removal of the air filter system 10 from the air supply nozzle 30 is essentially just a reversal of the above-described installation process. Thus, the passenger merely rotates the clamp sleeve 12 in a direction which moves the clamp sleeve 12 away from the second housing section 22 (preferably in a counterclockwise direction as viewed by the passenger). Such rotation of the clamp sleeve 12 allows the distal ends of the fingers 42 to move radially outwardly, thus releasing their grip upon the air supply nozzle 30 and allowing the air filter system 10 to easily be removed from the air supply nozzle 30.

The clamp sleeve 12 and the second housing section 22 are preferably comprised of clear polystyrene, such as KRO1 Clear Philips. Alternatively, the clamp sleeve 12 and the second housing section 22 are comprised of either ABS or polycarbonate ABS.

The air outlet nozzle 24 is preferably comprised of acetal copolymer. Alternatively, the air outlet nozzle 24 is comprised of either ABS or polycarbonate ABS.

The clamp fingers 42 and the first housing section 18 are preferably formed of Acetal M90 Natural Celcon or molded nylon.

The clamp sleeve 12 is preferably transparent, so as to facilitate viewing of the fingers 22 as they are tightened upon the air supply nozzle 30, in order to assure proper attachment of the air filter system 10 to the air supply nozzle 30 during the installation process. The fingers 42 are also preferably transparent, so as to facilitate viewing of the seal 16, so as to assure that the seal is properly compressed, i.e., so as to insure that the air supply nozzle is properly seated to the seal 16 in a manner which minimizes air leakage.

The first housing section 18 and/or the second housing section 22 are preferably transparent, so as to facilitate viewing of the filter medium 20. In this manner, a visual determination of the need to replace the filter medium 20 is easily performed.

Figure 6:
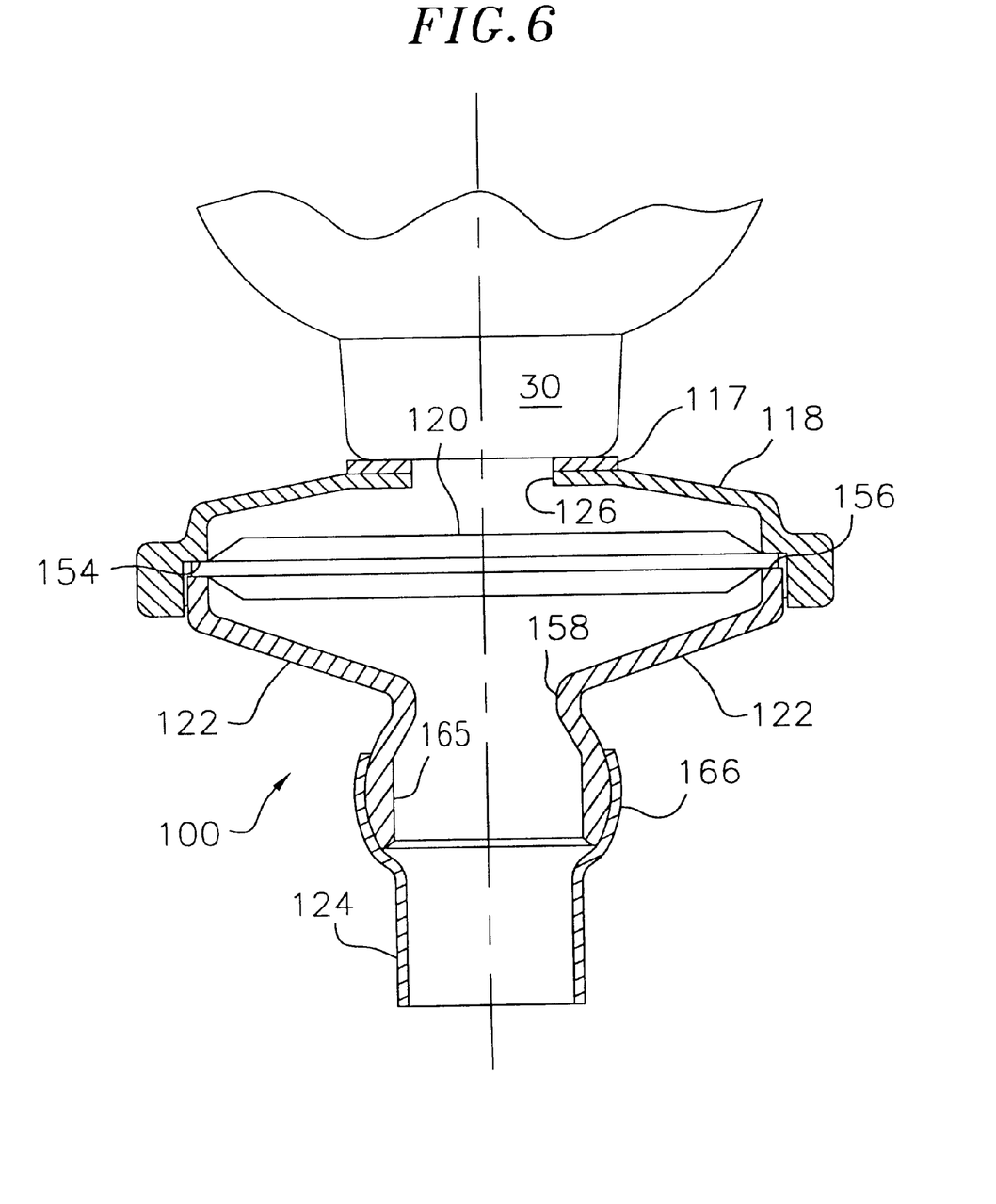
FIG. 6 is a semi-schematic, cross-sectional, side view of an alternative configuration of the air filter system, wherein the housing is attached to the air supply nozzle via adhesive bonding.

Referring now to FIG. 6, according to an alternative configuration, the air filter system 100 has a housing which comprises a first housing section 118 attached to a second housing section 122 and has a filter medium 120 captured between a shoulder 154 of the first housing section 118 and a shoulder 156 of the second housing section 122.

The first housing section 118 may be permanently attached, e.g., via adhesive bonding, ultrasonic welding, etc., to the second housing section 122. When the first housing section 118 is permanently attached to the second housing section 122, then the air filter system 100 is considered to be disposable, i.e., intended for only a limited number of uses.

Alternatively, the first housing section 118 may be removably attached, e.g., via threaded coupling or the use of fasteners, to the second housing section 122, so as to facilitate easy removal and replacement of the filter medium 120. Thus, for example, the first housing section 118 optionally comprises female threads and the second housing member 122 optionally comprises male threads which screw into the female threads of the first housing section 118, so as to capture the filter medium 120 between the first housing section 118 and the second housing section 122. The first 118 and second 122 housing sections may also be attached to one another via bayonet detents and the like.

The first housing section 118 has an opening 126 through which air from the air supply nozzle 30 is received. The second housing section 122 similarly has an opening 158 through which air exits the second housing 122. Air outlet nozzle 124 comprises a socket 166 which fits over and attaches to a complimentary ball 165 of the lower housing section 122, so as to facilitate desired aiming of the comparatively clean air output of the air filter system 100.

The air filter system 100 is attached to the air supply nozzle 30 of an airliner via adhesive bonding, such as by adhesive foam pad 117 which defines a seal or gasket. The adhesive foam pad 117 comprises a layer of foam material having pressure sensitive adhesive formed to at least one surface, i.e., the upper surface, thereof. Optionally, the foam material may have adhesive formed to both surfaces thereof, such that the foam material is attached to the upper housing 118 via adhesive bonding.

The adhesive foam pad 117 is preferably configured as a washer and preferably has sufficient thickness so as to provide a desired air seal between the air supply nozzle 30 and the air filter system 100 in spite of surface imperfections formed in the air supply nozzle 30 and/or the first housing section 118. That is, the foam adhesive pad 117 is sufficiently resilient to fill-in gaps between the air supply nozzle 30 and the first housing section 118, so as to inhibit air leakage therebetween.

One example of such a pressure sensitive adhesive which is pre-applied to a foam material is 3M COMMAND ADHESIVES™, provided by 3M Company of St. Paul, Minn. The foam gasket 117 preferably has a thickness of between 0.030 inch and 0.100 inch, preferably, approximately 0.80 inch.

The air filter system 100 is preferably attached to a air supply nozzle 30 of an airliner by first removing a protective paper covering from the adhesive foam 117, so as to expose the adhesive thereof. The air filter system 100 is then pushed against the air supply nozzle 30, so as to cause the foam adhesive 117 to compress slightly and adhere to the air supply nozzle 30. Such compression of the foam adhesive 117 both assures adequate contact of the adhesive with the air supply nozzle 30, so as to provide reliable attachment of the air filter system 100 to the air supply nozzle 30, and also pushes the foam of the foam adhesive 117 into any gaps or other surface imperfections formed at the interface of the upper housing section 118 and the air supply nozzle 30, so as to mitigate air leakage therebetween.

After installation of the air filter system 100 to the air supply nozzle 30, the air outlet nozzle 124 thereof may be manipulated so as to direct air in a desired direction, such as upon the head and/or torso of the passenger. Air flow through the air filter system 100 may be controlled by rotating the air supply nozzle 30, so as to effect control of the butterfly valve associated therewith. The air supply nozzle 30 may be rotated either by grasping and turning the air supply nozzle 30 itself, or by grasping and turning the air filter system 100 of the present invention.

The first 118 and second 122 housing sections are preferably formed of clear polystyrene such as KRO1 Clear Philips. The air outlet nozzle 124 is preferably comprised of acetal copolymer. Alternatively, the first 118 and second 122 housing sections and air outlet nozzle 124 may be comprised of ABS or polycarbonate ABS.

The first 118 and second 122 housing sections are preferably transparent, so as to facilitate easy viewing of the filter medium 120, such that a need to replace the filter medium 120 or the entire air filter system 100 may easily be determined.

Those skilled in the art will appreciate that various other materials are suitable for use in the construction of either configuration of the present invention. Generally, it is desirable that the air filter system of either configuration of the present invention be comprised of durable, preferably transparent plastic materials.

It is understood that the exemplary air filter system described herein and shown in the drawings represents only the presently preferred embodiment of the invention. Indeed, various modifications and additions may be made to such embodiment without departing from the spirt and scope of the invention. For example, although the housing of the air filter system of the present invention is described and shown as being generally circular in cross-section, those skilled in the art will appreciate the various other cross-sectional configurations are likewise suitable. For example, the air filter system of the present invention may instead have a cross-sectional configuration which is generally square, rectangular, triangular, hexagonal, octagonal, oval or any other desired shape.

Further, various different filter medium types are contemplated. A charcoal, ion exchange resin or other similar absorbent may be utilized so as to enhance removal of chemical contaminants. Indeed, any desired combination of filter mediums or types may of filter mediums be utilized.

Further, various different types of clamping mechanisms for attaching the air filter system of the present invention to an air supply nozzle or the like are contemplated. The clamping mechanism need not comprise a collet having fingers but rather may comprise any structure which effects clamping of the housing of the air filter system of the present invention to an air supply nozzle or the like. These and other modifications and additions may be obvious to those skilled in the art and may be implemented to adapt the present invention for a use in a variety of different applications.

What is claimed is:

1. An air filter system comprising:
    a housing having an inlet port and an outlet port, the inlet port defining an interior surface and an exterior surface proximate the inlet port;
    an adhesive foam pad disposed on the exterior surface of the inlet port;
    a filter medium disposed in a central cavity of the housing;
    an air directional nozzle attached to the outlet port of the housing and movable relative to the outlet port; and
    wherein the adhesive foam pad is configured to adhere to an air supply ventilation nozzle in the passenger compartment of a vehicle, and wherein the air directional nozzle is configured to direct air flow in a desired flow direction when the air directional nozzle is moved relative to the outlet port.

2. The air filter system as recited in claim 1, further comprising:
    threads formed upon the housing, the threads being formed on a first housing section and a second housing section, and the first and second housing sections being threaded together to enclose the filter medium within the housing.

3. The air filter system as recited in claim 1, wherein the filter medium is contained within the housing.

4. The air filter system as recited in claim 1, wherein the housing comprises a separable two-part housing.

5. The air filter system as recited in claim 1, wherein:
    the housing comprises a separable two-part housing defining first and second housing sections thereof; and
    the first and second housing sections of the two-part housing are attached to one another via a plurality of bayonet detents.

6. The air filter system as recited in claim 1, wherein:
    the housing comprises a two-part housing which is configured such that the filter medium is held intermediate first and second housing sections thereof; and
    wherein the first and second sections of the two-part housing are separable from one another to facilitate removal and replacement of the filter media.

7. The air filter system as recited in claim 1, wherein the air directional nozzle is attached to the outlet port in a ball and socket configuration.

8. The air filter system as recited in claim 1, further comprising:
    a ball formed to the housing, the ball being formed at the outlet port of the housing; and
    the air directional nozzle receives the ball so as to facilitate aiming of air exiting the housing.

9. The air filter system as recited in claim 1, wherein the filter medium comprises a disposable filter medium.

10. The air filter system as recited in claim 1, wherein the filter medium comprises an electrostatically charged polypropylene non-woven membrane.

11. The air filter system as recited in claim 1, wherein the housing comprises an ultrasonically welded two-part housing section.

12. The air filter system as recited in claim 1, wherein at least a portion of the housing is formed from a transparent material.

13. The air filter system as recited in claim 1, wherein at least a portion of the housing is formed from a transparent material which is configured so as to facilitate verification of proper attachment of the housing to the air supply nozzle.

14. The air filter system as recited in claim 1, wherein at least a portion of the housing is formed from a transparent material which is configured so as to facilitate inspection of the seal so as to mitigate air leakage.

15. The air filter system as recited in claim 1, wherein at least a portion of the housing is formed from a transparent material which is configured so as to facilitate visual inspection of the filter.

16. An air filter system for connection to an air supply ventilation nozzle in a vehicle compartment, the air filter system comprising:
    a housing comprising an inlet port and an outlet port;
    a filter medium mounted within the housing such that air entering the housing via the inlet port is filtered by the filter medium prior to exiting the housing via the outlet port;
    a mounting assembly for mounting the housing to the air supply ventilation nozzle, the mounting assembly comprising:
    a seal for mitigating air leakage intermediate the air supply ventilation nozzle and the housing;
    a plurality of fingers extending from the housing; and
    a clamp sleeve threadedly attached to the housing and having an opening formed therein, the opening being configured to urge the fingers inwardly toward the air supply ventilation nozzle such that a distal portion of the fingers effect engagement with the air supply ventilation nozzle so as to removably attach the housing to the air supply ventilation nozzle.

17. A method for filtering air, the method comprising:
    clamping a filter medium to an air supply ventilation nozzle in the passenger compartment of a vehicle by turning a sleeve and moving a plurality of fingers from a first position to a second position to engage the air supply ventilation nozzle; and
    directing air from the air supply nozzle through the filter medium.

18. The method as recited in claim 17, wherein:
    clamping a filter medium to an air supply nozzle comprises clamping a housing to the air supply nozzle; and
    the housing is configured to direct air from the air supply nozzle through the filter medium.

19. The method as recited in claim 17, wherein clamping the filter medium to the air supply nozzle comprises clamping the filter medium to the air supply nozzle via a collet.

20. The method as recited in claim 17, wherein clamping the filter medium to the air supply nozzle comprises clamping the filter medium to the air supply nozzle via a plurality of fingers of a collet, the fingers moving inwardly so as to grasp the air supply nozzle.

21. The method as recited in claim 17, wherein clamping the filter medium to the air supply nozzle comprises clamping the filter medium to the air supply nozzle via a plurality of fingers of a collet, the fingers being configured so as to grasp a gasper nozzle when moved inwardly.

22. The method as recited in claim 17, wherein clamping the filter medium to the air supply nozzle comprises moving a sleeve, the sleeve urging a plurality of fingers to move inwardly so as to grasp the air supply nozzle.

23. The method as recited in claim 17, wherein clamping the filter medium to the air supply nozzle comprises rotating a sleeve with respect to the housing, the sleeve urging a plurality of fingers to move inwardly so as to grasp the air supply nozzle.

24. The method as recited in claim 17, wherein clamping the filter medium to the air supply nozzle comprises moving a sleeve, the sleeve urging a plurality of fingers to move inwardly so as to grasp the air supply nozzle, each of the fingers having a resilient pad formed proximate a distal end thereof so as to enhance grasping of the air supply nozzle.

25. The method as recited in claim 17, wherein the filter medium is contained within the housing.

26. The method as recited in claim 17, wherein the filter medium is contained within a separable two-part housing.

27. The method as recited in claim 17, wherein:
the filter medium is disposed within a housing;
the housing comprises a separable two-part housing defining first and second housing sections thereof; and
the first and second housing sections of the two-part housing are attached to one another via a plurality of bayonet detents.

28. The method as recited in claim 17, wherein:
the filter medium is disposed within a housing;
the housing comprises a two-part housing which is configured such that the filter medium is held intermediate first and second housing sections thereof; and
wherein the first and second housing sections are separable from one another to facilitate removal and replacement of the filter media.

29. The method as recited in claim 17, further comprising mitigating air leakage intermediate the filter medium and the air supply nozzle when the housing is clamped to the air supply nozzle.

30. The method as recited in claim 17, further comprising mitigating air leakage intermediate the filter medium and the air supply nozzle with a seal, when the housing is clamped to the air supply nozzle.

31. The method as recited in claim 17, further comprising pivoting an air outlet nozzle which is attached to the housing so as to facilitate aiming of air exiting the housing.

32. The method as recited in claim 17, wherein:
a ball is formed to the housing, the ball being formed at an air exit orifice thereof; and
an air outlet nozzle has a socket which receives the ball so as to facilitate aiming of air exiting the housing.

33. The method as recited in claim 17, wherein the filter medium comprises a disposable filter medium.

34. The method as recited in claim 17, wherein the filter medium comprises an electrostatically charged polypropylene non-woven membrane.

35. The method as recited in claim 17, wherein the filter medium is disposed with a housing and the housing is configured to clamp to an airline air nozzle.

36. The method as recited in claim 17, further comprising adjusting air flow by turning the housing.

37. The method as recited in claim 17, further comprising aiming airflow by aiming an air outlet nozzle attached to the housing.

38. An air filter system comprising:
a housing;
a filter medium;
a collet, said collet comprising at least two fingers; and
wherein the housing is configured to attach to an air supply ventilation nozzle in a vehicle passenger compartment via the at least two fingers moving from a first position to a second position to thereby grip the air supply ventilation nozzle, and wherein the housing is further configured to direct air from the air supply nozzle through the filter medium.

39. The air filter system as recited in claim 38, wherein the filter medium is contained within the housing.

40. The air filter system as recited in claim 38, wherein the housing comprises a separable two-part housing.

41. The air filter system as recited in claim 38, wherein:
the housing comprises a separable two-part housing defining first and second housing sections thereof; and
the first and second housing sections of the two-part housing are attached to one another via a plurality of bayonet detents.

42. The air filter system as recited in claim 38, wherein:
the housing comprises a two-part housing which is configured such that the filter medium is held intermediate first and second housing sections thereof; and
wherein the first and second sections of the two-part housing are separable from one another to facilitate removal and replacement of the filter media.

43. The air filter system as recited in claim 38, further comprising an air outlet nozzle pivotally attached to the housing so as to facilitate aiming of air exiting the housing.

44. The air filter system as recited in claim 38, further comprising:
a ball formed to the housing, the ball being formed at an air exit orifice thereof; and
an air outlet nozzle having a socket which receives the ball so as to facilitate aiming of air exiting the housing.

45. The air filter system as recited in claim 38, wherein the filter medium comprises a disposable filter medium.

46. The air filter system as recited in claim 38, wherein the filter medium comprises an electrostatically charged, polypropylene, non-woven membrane.

47. The air filter system as recited in claim 38, wherein at least a portion of the housing is formed of a transparent material.

48. The air filter system as recited in claim 38, wherein at least a portion of the housing is formed of a transparent material which is configured so as to facilitate verification of proper attachment of the housing to the air supply nozzle.

49. The air filter system as recited in claim 38, wherein at least a portion of the housing is formed from a transparent material which is configured so as to facilitate inspection of a seal in order to mitigate air leakage.

50. The air filter system as recited in claim 38, wherein at least a portion of the housing is formed of a transparent material which is configured so as to facilitate visual inspection of the filter.

51. An air filter system for connection to an air supply ventilation nozzle in a vehicle compartment, the air filter system comprising:
a housing comprising an air inlet opening and an air outlet opening; wherein the air inlet opening defines a generally planar exterior surface and a corresponding interior surface;
a filter medium mounted within the housing such that air entering the housing via the air inlet opening is filtered by the filter medium prior to the air exiting the housing via the air outlet opening;

a foam gasket having a central opening for the passage of air positioned on the exterior surface of the inlet opening and generally surrounding the inlet opening such that air that exits the air supply ventilation nozzle passes through the central opening of the foam gasket also passes through the inlet opening;

adhesive formed upon the foam gasket for attaching the air filter system to the air supply ventilation nozzle via attaching the adhesive portion of the foam gasket to the air supply ventilation nozzle; and wherein air that passes through the central opening of the foam gasket gets filtered by the filter medium mounted within the housing before it exists the outlet opening.

52. A method for filtering air, the method comprising:

attaching an inlet opening of a housing comprising a filter medium to an air supply nozzle in a vehicle passenger compartment via an adhesive or a clamp positioned proximate the inlet opening, wherein the adhesive comprises a foam pad and an air passage opening and the clamp comprises a plurality of fingers having a first position and a second clamping position;

directing air from the air supply nozzle through the filter medium by attaching the adhesive along at least a portion of the air supply nozzle such that air passes through the air passage opening or moving the plurality of fingers to a second clamping position to secure the housing to the air supply nozzle such that a substantial portion of incoming air passes through the filter medium; and directionally adjusting the air as it exists an outlet opening of the housing by moving an air directional nozzle attached to the outlet opening relative to the outlet opening.

53. The method as recited in claim 52, wherein attaching the inlet opening to an air supply nozzle via an adhesive comprises attaching the opening to the air supply nozzle via an adhesive which is formed upon a foam material.

54. The method as recited in claim 52, wherein attaching the inlet opening to an air supply nozzle via an adhesive comprises attaching the inlet opening to the air supply nozzle via an adhesive which is formed upon a foam gasket.

55. The method as recited in claim 52, wherein attaching the inlet opening to an air supply nozzle via an adhesive comprises attaching the foam pad located at the inlet opening to the air supply nozzle such that the air supply nozzle is attached to the foam pad via the adhesive.

56. The method as recited in claim 52, wherein the adhesive and the filter medium are disposable.

57. The method as recited in claim 52, wherein the housing comprises a separable two-part housing and the filter medium is contained within the separable two-part housing.

58. The method as recited in claim 52, wherein:

the filter medium is disposed within the housing;

the housing comprises a separable two-part housing defining first and second housing sections thereof; and the first and second housing sections of the two-part housing are attached to one another via a plurality of bayonet detents.

59. The method as recited in claim 52, wherein:

the filter medium is disposed within the housing;

the housing comprises a two-part housing which is configured such that the filter medium is held intermediate first and second housing sections thereof; and wherein the first and second housing sections are separable from one another to facilitate removal and replacement of the filter media.

60. The method as recited in claim 52, wherein the air directional nozzle and the outlet opening are attached to one another in a ball and socket configuration.

61. The method as recited in claim 52, wherein the filter medium comprises a disposable filter medium.

62. The method as recited in claim 52, wherein the filter medium comprises an electrostatically charged, polypropylene, non-woven membrane.

63. The method as recited in claim 52, further comprising adjusting air flow by turning the housing.

64. The method as recited in claim 52, further comprising aiming airflow by pushing against an exterior portion of the air directional nozzle.

65. The air filter of claim 1, wherein said vehicle is an airplane.

66. The air filter of claim 1, wherein said vehicle is a bus.

67. The air filter of claim 1, wherein said vehicle is a public transportation vehicle.

68. The air filter of claim 16, wherein said vehicle is an airplane.

69. The air filter of claim 16, wherein said vehicle is a bus.

70. The air filter of claim 16, wherein said vehicle is a public transportation vehicle.

71. The air filter of claim 17, wherein said vehicle is an airplane.

72. The air filter of claim 17, wherein said vehicle is a public transportation vehicle.

73. The air filter of claim 38, wherein said vehicle is an airplane.

74. The air filter of claim 38, wherein said vehicle is a public transportation vehicle.

75. The air filter of claim 52, wherein said vehicle is an airplane.

76. The air filter of claim 52, wherein said vehicle is a public transportation vehicle.

77. The air filter system of claim 51, further comprising an air directional nozzle engaged to the outlet opening, the air directional nozzle comprising a centrally cylindrical section sized to move relative to the outlet opening to directionally divert air exiting the outlet opening.

78. The air filter system of claim 51, wherein the housing comprises a two-part structure attached to one another by at least one of detent engagement, threaded engagement, welding, or bonding.

79. The air filter system of claim 51, wherein the housing is disposable.

80. The air filter system of claim 77, wherein the air directional nozzle is engaged to the outlet opening in a ball and socket configuration.

81. The air filter system of claim 1, wherein the housing is disposable.

82. The air filter system of claim 52, wherein the housing is disposable.

* * * * *

UNITED STATES PATENT AND TRADEMARK OFFICE
CERTIFICATE OF CORRECTION

PATENT NO. : 6,610,116 B1
DATED : August 26, 2003
INVENTOR(S) : Neal H. Avery

It is certified that error appears in the above-identified patent and that said Letters Patent is hereby corrected as shown below:

Title page,
Item [76], Inventors, change "186 Valley View Ter.," to -- 16 Belcanto --
Item [56], References Cited, U.S. PATENT DOCUMENTS, change
"4,825,469 * 5/1989 Kincheloe" to
-- 4,925,469 * 5/1990 Clement et al. --

Column 17,
Lines 15 and 33, change "exists" to -- exits --

Signed and Sealed this

Second Day of March, 2004

JON W. DUDAS
*Acting Director of the United States Patent and Trademark Office*